United States Patent
Braun et al.

(10) Patent No.: US 12,525,085 B2
(45) Date of Patent: Jan. 13, 2026

(54) METHOD AND DEVICE FOR FURTHER PROCESSING VALUE DOCUMENTS

(71) Applicant: GIESECKE+DEVRIENT CURRENCY TECHNOLOGY GMBH, Munich (DE)

(72) Inventors: Harald Braun, Munich (DE); Steffen Dittrich, Unterfohring (DE); Reinhold Gryxa, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 1040 days.

(21) Appl. No.: 17/414,157

(22) PCT Filed: Dec. 17, 2019

(86) PCT No.: PCT/EP2019/000341
§ 371 (c)(1),
(2) Date: Jun. 15, 2021

(87) PCT Pub. No.: WO2020/126067
PCT Pub. Date: Jun. 25, 2020

(65) Prior Publication Data
US 2022/0084345 A1    Mar. 17, 2022

(30) Foreign Application Priority Data

Dec. 19, 2018 (DE) .................. 10 2018 010 036.8

(51) Int. Cl.
*G07D 11/235* (2019.01)
*B65B 13/18* (2006.01)
(Continued)

(52) U.S. Cl.
CPC .......... *G07D 11/235* (2019.01); *B65B 13/182* (2013.01); *G06K 1/121* (2013.01);
(Continued)

(58) Field of Classification Search
CPC ...... G07D 11/235; G07D 11/30; G07D 11/32; G07D 2211/00; G06K 1/121;
(Continued)

(56) References Cited

U.S. PATENT DOCUMENTS

| 4,240,281 A | 12/1980 | Lather et al. | |
| 7,516,601 B2 * | 4/2009 | Horiuchi | B65H 39/10 |
| | | | 53/540 |

(Continued)

FOREIGN PATENT DOCUMENTS

| CN | 102511056 A | 6/2012 |
| CN | 104620596 A | 5/2015 |

(Continued)

OTHER PUBLICATIONS

International Search Report and Written Opinion from PCT Application No. PCT/EP2019/000341, Apr. 7, 2020.

*Primary Examiner* — Jeffrey A Shapiro
(74) *Attorney, Agent, or Firm* — Workman Nydegger

(57) ABSTRACT

A method and an apparatus are provided for further processing and for packing value documents, which were previously processed by a value document processing apparatus and bundled to form bundles. Labels are created for the bundles, which have a machine-readable identification item linked to the respective bundle's visible serial number. Before or after each bundle is labeled, an image of the bundle is detected with the aid of an inspection device to ascertain the actual serial number of the bundle and compare it to the serial number that belongs to the machine-readable identification. In dependence on whether or not the actual visible serial number of the respective bundle matches the visible serial number belonging to the machine-readable (Continued)

identification for the bundle, the respective bundle is further processed (e.g., packed by a packing apparatus) or not processed.

20 Claims, 3 Drawing Sheets

(51) Int. Cl.
| | | |
|---|---|---|
| *G06K 1/12* | (2006.01) | |
| *G06V 30/42* | (2022.01) | |
| *G07D 11/30* | (2019.01) | |
| *G07D 11/32* | (2019.01) | |
| *G09F 3/00* | (2006.01) | |
| *G06K 7/10* | (2006.01) | |

(52) U.S. Cl.
CPC ............. *G06V 30/42* (2022.01); *G07D 11/30* (2019.01); *G07D 11/32* (2019.01); *G09F 3/0297* (2013.01); *B65H 2301/4314* (2013.01); *G06K 7/10861* (2013.01); *G07D 2211/00* (2013.01)

(58) Field of Classification Search
CPC .. G06K 7/10861; G06V 30/42; G09F 3/0297; B65H 2301/4314; B65H 2701/1912; B65H 5/002; G05B 2219/31078; G05B 2219/32121; G05B 2219/32391; G05B 2219/39106; B65B 13/182; B65C 2009/0003
See application file for complete search history.

(56) References Cited

U.S. PATENT DOCUMENTS

| | | | |
|---|---|---|---|
| 8,056,305 B1 * | 11/2011 | Folk | G07D 11/50 |
| | | | 53/399 |
| 8,811,710 B2 | 8/2014 | Demmeler et al. | |
| 10,351,288 B2 * | 7/2019 | Hirose | B65B 65/003 |
| 10,593,143 B2 * | 3/2020 | Numata | G07D 11/16 |
| 10,940,968 B2 * | 3/2021 | Liu | G07D 11/50 |
| 2002/0005030 A1 * | 1/2002 | Ohshita | G07F 5/24 |
| | | | 53/135.1 |
| 2007/0040014 A1 * | 2/2007 | Zhao | G06Q 20/108 |
| | | | 235/379 |
| 2008/0135608 A1 * | 6/2008 | Ireland | G07D 11/225 |
| | | | 232/1 D |
| 2009/0243181 A1 * | 10/2009 | Sauer | B65H 33/16 |
| | | | 270/58.08 |
| 2012/0042610 A1 | 2/2012 | Giovanetto et al. | |
| 2012/0134572 A1 | 5/2012 | Demmeler et al. | |
| 2013/0340397 A1 * | 12/2013 | Okamoto | B65B 25/14 |
| | | | 53/582 |
| 2014/0032396 A1 | 1/2014 | Sheng et al. | |
| 2018/0005481 A1 * | 1/2018 | Nakanishi | B65H 3/042 |

FOREIGN PATENT DOCUMENTS

| | | | |
|---|---|---|---|
| FR | 2410277 A1 | 6/1979 | |
| GB | 2452873 A | 11/2006 | |
| JP | 2015056010 A | 3/2015 | |
| JP | 2018032212 A | 3/2018 | |
| WO | WO 2014/018714 A1 * | 1/2014 | ............. G07D 11/30 |

* cited by examiner

METHOD AND DEVICE FOR FURTHER PROCESSING VALUE DOCUMENTS

BACKGROUND

The invention relates to a method and an apparatus for further processing and, possibly, for packing value documents, in particular banknotes.

In the automated processing of value documents, such as, for example, banknotes, these are individually verified with respect to various properties by a value document processing apparatus, possibly sorted, and stacked in output pockets or possibly directly fed to a destruction process. In some value document processing apparatus, the value document stacks output into the output pockets are first combined into banded packets by means of bands, and several banded packets are subsequently bundled into a bundle with the aid of a pre-packing material. The pre-packed bundles are then transported with the aid of a transport apparatus to a packing apparatus in which one or several of the bundles are packed to form a packing unit. In order to be able to distinguish the pre-packed bundles from one another, they are supplied with a label on their transport route from the value document processing apparatus to the packing apparatus, which makes the respective bundle identifiable.

On the transport route from the value document processing apparatus to the packing apparatus, however, technical problems or malfunctions can occur which require the intervention of an operator. In order to remedy these, in some cases the operator has to remove one or several of the bundles from the transport apparatus and—after the malfunction has been remedied—place them back on in the correct sequence. This can lead to the bundles being accidentally interchanged, wherein the sequence of the bundles on the transport apparatus is changed. The changed sequence can result in the labels being applied to the wrong bundles during the subsequent labeling of the bundles and thus incorrectly labeled bundles ending up in a packing unit. The faulty packing units must subsequently be unpacked again and the errors remedied.

SUMMARY

It is therefore an object of the invention to avoid the subsequent unpacking of faulty packing units.

With a value document processing apparatus, value documents are processed, in particular checked and possibly sorted, and stacked to form value document stacks. The value document stacks are—e.g. in the output module of the value document processing apparatus—each bundled together e.g. with an enclosing material in order to form a bundle and the bundle is output in an output pocket of the value document processing apparatus. For the further processing of the value documents after the value document processing apparatus, the value document processing apparatus determines the visible serial number of the respective value document stack or bundle that is representative of the value document stack and the bundle. The visible serial number of the respective bundle is visible from outside the bundle, e.g. the visible serial number of the bundle is the serial number of the value document that is the uppermost or lowermost one in the stack of the respective bundle. In principle, there can be one or two visible serial numbers in a bundle. In the case of two visible serial numbers, it is sufficient for the value document processing apparatus to determine one of these two.

For the further processing of the value documents or the bundle, the visible serial number of the respective bundle is transmitted from the value document processing apparatus to a control device. On the basis of the respective visible serial number, the control device determines a machine-readable identification for the respective bundle, which is provided for application to a label for the respective bundle. The control device additionally produces a linking information item which specifies which visible serial number of the respective bundle the respective machine-readable identification belongs to or which visible serial number of the respective bundle the respective machine-readable identification is linked to.

The machine-readable identification is transmitted from the control device to a labeling device connected to the control device. The labeling device creates labels for the individual bundles, e.g. with the aid of a label printer of the labeling device. For each bundle, one of the machine-readable identifications transmitted by the control device is applied to the respective label. The bundles output from the value document processing apparatus are e.g. automatically transported by means of a transport device from the value document processing apparatus to the labeling device. The labeling device labels the bundle, in particular by attaching the respective label to the enclosing material of the respective bundle that was created for the respective bundle. The applied machine-readable identification can be e.g. a bar code, a data matrix code (e.g. QR code) or an RFID element.

The bundles are detected by an inspection device which captures one or several images of the respective bundle and has one or several cameras for this purpose. The image or images are captured in such a manner that the visible serial number of the respective bundle is depicted thereon, and possibly also the label of the bundle. On one of the images that value document section of the uppermost or lowermost value document of the stack is depicted that has the visible serial number of the respective bundle. When checking the respective bundle, the actual visible serial number of the respective bundle is first extracted from an image captured by the inspection device. Second, when checking the respective bundle, also the visible serial number is ascertained that belongs to the machine-readable identification of the label that was created by the labeling device for the respective bundle, i.e. the visible serial number belonging to the machine-readable identification of the respective label.

The respective bundle is transported by means of a transport device along a transport direction either first to the labeling device and then to the inspection device or, alternatively, first to the inspection device and then to the labeling device.

In one embodiment example, the respective bundle is labeled with the label created for the respective bundle before the respective bundle is detected by the inspection device, so that the inspection device detects the already labeled bundle. The inspection device is arranged in this case along the transport direction of the bundles downstream of the labeling device. By checking the already labeled bundles, a more reliable checking of the bundles is achieved, since the checking also exposes errors that occur in the labeling device, e.g. when printing labels, applying labels or an interchange of the bundle sequence in the labeling device.

In this embodiment example, the label of the respective bundle, which has the machine-readable information belonging to the visible serial number, is the label already applied to the enclosing material of the respective bundle. At the time of checking the respective bundle, the respective bundle is already labeled. When checking, the visible serial number is then ascertained, which belongs to the machine-readable information on the label applied to the respective bundle. For example, the visible serial number linked to the machine-readable information is ascertained from the machine-readable identification of the label on the basis of the linking information. To ascertain the visible serial number belonging to the machine-readable information it is also possible, however, to carry out a decoding of the machine-readable identification, if the visible serial number is contained in the machine-readable identification in coded form. The actual visible serial number of the respective labeled bundle is then compared with the visible serial number belonging to the machine-readable information on the label applied to the bundle.

In an alternative embodiment example, the respective bundle is detected by the inspection device before the respective bundle is labeled with the label created for the respective bundle, so that the inspection device detects the not yet labeled bundle. In this case, the inspection device is arranged along the transport direction of the bundles upstream of the labeling device. Compared to the aforementioned embodiment example, this has the advantage that errors are discovered before labeling, thereby avoiding the need to subsequently remove labels from incorrectly labeled bundles. In order to prevent the operator from accidentally changing the sequence of the bundles in the transport section between the inspection device and the labeling device, in this embodiment example the inspection device is arranged along the transport direction preferably immediately upstream of the labeling device, so that it is impossible for an operator to access the bundles in this transport section. For this purpose, the inspection device can be arranged on or in a housing surrounding the labeling device.

In the case of the alternative embodiment example, the inspection device detects the bundle that has not yet been labeled. The label of the respective bundle, which specifies the visible serial number belonging to the machine-readable information, is then the label provided for the respective bundle, which has not yet been applied to the enclosing material of the respective bundle. At the time of checking the respective bundle, the label has only been created by the labeling device for the respective bundle and made available for application to this bundle, but has not yet been applied to the respective bundle. When checking, the visible serial number is ascertained, which belongs to the machine-readable information of the label that is provided for the respective bundle and is ready to be applied to the respective bundle. For example, the control device looks up the machine-readable identification had by the next label made available by the labeling device for application to a bundle, and ascertains the visible serial number linked to the machine-readable information on the basis of the linking information. To this end, it can be helpful that the labeling device sends a feedback to the control device every time a bundle has been labeled with a label that has been made available. The actual visible serial number of the respective (not yet labeled) bundle is then compared with the visible serial number belonging to the machine-readable information of the (not yet applied) label that is provided for application to the respective bundle. For example, the labeling device waits with the application of the finished printed label until, in the checking of the associated bundle—provided that no error is detected during the checking—, the respective bundle is released for applying the respective label and then finally labels the bundle.

Depending on whether the checking of the respective bundle has the result that the actual visible serial number of the respective bundle matches the visible serial number belonging to the machine-readable identification of the respective label or not, the further processing of the respective bundle is continued or stopped. When the further processing is continued, the respective bundle can be labeled with the label provided for the bundle, in particular by the labeling device, and/or can be packed by a packing apparatus. In the alternative embodiment example, in which the respective bundle is checked before the respective bundle is labeled, the respective bundle—if the checking has not revealed any errors—during further processing is preferably first labeled by the labeling device with the label provided for the bundle and is subsequently packed by a packing apparatus.

The checking of the respective bundle can be carried out by the inspection device or the control device or by both in interaction with one another. By checking the visible serial numbers according to the invention, incorrect labeling of the bundles or the packing of incorrectly labeled bundles is avoided. If, in the event of technical problems or malfunctions, the sequence of the bundles in which these arrive at the labeling device is changed through the intervention of an operator, this is noticeable when checking the serial numbers. The further processing of the bundles can then be stopped in good time and the operator can be notified.

If the checking of the respective bundle has the result that the actual visible serial number of the respective bundle matches the visible serial number belonging to the machine-readable identification of the respective label, the respective bundle is e.g. forwarded to a packing apparatus and the labeled bundle is packed with the aid of the packing apparatus. This can be carried out automatically with the aid of a transport device which is arranged along the transport direction of the bundles downstream of the inspection device and the labeling device and is adapted to transport the respective labeled bundle into the packing apparatus. When packing with the aid of the packing apparatus, respectively one or several of the labeled bundles can be packed to form one packing unit in each case.

If the checking of the respective bundle has the result that the actual visible serial number of the respective bundle does not match the visible serial number belonging to the machine-readable identification of the respective label, packing by a packing apparatus is prevented, e.g. by not forwarding the respective labeled bundle to the packing apparatus. If the visible serial numbers do not match, an error message is preferably output on an operator interface, e.g. at an operator interface of the packing apparatus. Alternatively, if the visible serial numbers do not match, the respective labeled bundle can nevertheless be forwarded to the packing apparatus, but the control device can cause a stopping of the transport device leading into the packing apparatus or can cause a stopping of the packing apparatus. The control device can also cause the packing apparatus to output the faulty bundles again unpacked from the packing apparatus. The faulty bundles can be sorted out and output separately from the packed bundles.

In the embodiment example in which the inspection device detects the already labeled bundle, it is optionally possible also for the label of the bundle, which has the machine-readable identification of the respective labeled bundle, to be additionally depicted on the captured image of the respective bundle on which the visible serial number is depicted. If the visible serial number and the label are on the same side of the bundle, they are preferably also depicted in the same camera image. In this case, the label is applied in the labeling device in targeted manner, such that it does not cover the visible serial number. The visible serial number and the machine-readable identification can then be extracted from the same camera image.

Instead of this, the label can also be depicted on a different image captured by the inspection device, which the inspection device has captured of the respective bundle. For example, the label of the bundle can be applied to that side of the bundle on which the uppermost value document of the stack is located, and the visible serial number is located on the lowermost value document of the stack. Then the visible serial number and the machine-readable identification are extracted from different camera images. The other image is recorded from another side of the labeled bundle, in particular from the opposite side of the labeled bundle (compared to the aforementioned image). The other image can be captured by a second camera of the inspection device, which e.g. is directed to the opposite side of the labeled bundle—compared to the aforementioned (first) camera. Alternatively, the first camera can also detect the two images one after the other, by moving the camera or by rotating the bundle between capturing the two images.

In the embodiment example in which the inspection device detects the already labeled bundle, the machine-readable identification of the label can be extracted from an image captured by the inspection device when checking the respective bundle. The bar code or data matrix code forming the machine-readable identification can be extracted from the image and a decoding of the bar code or data matrix code can be carried out. The inspection device or a checking device extracts the machine-readable identification of the respective label from the captured image or from another image captured by the inspection device, which the inspection device captured of the respective bundle. Alternatively, the machine-readable identification of the respective labeled bundle can also be detected in other ways, e.g. by means of a reader, which the inspection device has in addition to the camera, which is employed to read the machine-readable information of the respective labeled bundle, e.g. a bar code reader or data matrix code reader or RFID reader.

The invention also relates to an apparatus for the further processing of the value documents processed with the value document processing apparatus and stacked to form value document stacks, which have been bundled together to form a bundle. The apparatus has the control device connected to the value document processing apparatus, which is adapted to process the respective visible serial number determined by the value document processing apparatus of the respective bundle from the value document processing apparatus, and to determine a machine-readable identification for the respective bundle and to produce a linking information item which specifies the visible serial number with which the respective machine-readable identification is linked. Further, the apparatus has the labeling device connected to the control device, which is adapted to process a machine-readable identification transmitted from the control device to the labeling device, and which is adapted to create a label that has the machine-readable identification transmitted by the control device and which is adapted to label the respective bundle.

Optionally, the further processing apparatus also has a transport device for transporting the respective bundle (from the value document processing apparatus) to the labeling device and then to the inspection device (or vice versa). The transport apparatus can also be present in addition to the further processing apparatus, e.g. it is independent or part of the value document processing apparatus.

The apparatus has an inspection device for detecting the respective bundle, which has one or several cameras. The camera or one of the cameras is arranged in such a manner that it can capture an image of the respective bundle on which the visible serial number of the respective bundle and possibly additionally its label are depicted. The control device and/or the inspection device are adapted, when checking the respective bundle to extract the actual visible serial number of the respective bundle from the image recorded by the inspection device, and to ascertain the visible serial number that belongs to the machine-readable identification of the label that was created for the respective bundle, and to compare the actual visible serial number of the respective bundle with the visible serial number belonging to the machine-readable identification of the respective label, and depending on whether the checking of the respective bundle has the result that the actual visible serial number of the respective bundle matches the visible serial number belonging to the machine-readable identification of the respective label or not, to continue or stop the further processing of the respective bundle, in particular to cause a packing of the respective labeled bundle by a packing apparatus or to prevent the packing by the packing apparatus.

The value document processing apparatus generates a multiplicity of value document stacks which are output one after the other in a specific sequence by the value document processing apparatus and are each bundled (by the value document processing apparatus or a bundling device connected thereto). The value document processing apparatus transfers the bundles to the transport device in such a manner that the bundles in the specific sequence are arranged one after the other on the transport device and are transported in this sequence to the labeling device (first to the labeling device and then to the inspection device or vice versa). The output bundles are thus transported to the labeling device by means of the transport device in the sequence predetermined by the value document processing apparatus. For the correct assignment of the bundles to the labels, the value document processing apparatus transmits the visible serial numbers of the bundles transferred to the transport device to the control device, preferably in the same sequence in the associated bundles are provided to be transported on the transport device to the labeling device (and in which sequence they are actually transported, provided that the bundles are not accidentally interchanged manually).

For this purpose, the value document processing apparatus can transmit the visible serial numbers e.g. serially in this specific sequence to the control device. Alternatively, it can transmit a list of visible serial numbers to the control device, wherein the sequence of the visible serial numbers in this list corresponds to the sequence in which the associated bundles are transported to the labeling device by means of the transport device. The sequence is e.g. apparent from the position of the serial number in the list. For example, the first visible serial number of the list is that of the bundle produced first, the second visible serial number of the list that of the bundle produced second, . . . .

The machine-readable identifications of the bundles can also be transmitted from the control device to the labeling device in the same sequence predetermined by the value document processing apparatus, in which the associated bundles are also transported on the transport device to the labeling device. For this purpose, the machine-readable identifications of the bundle e.g. be transmitted serially in this sequence from the control device to the labeling device or in the form of a list of machine-readable identifications in which the machine-readable identifications of the bundles are listed in the same sequence in which the bundles are transported on the transport device to the labeling device.

If the checking of the respective bundle has the result that the respective bundle is correctly labeled, the respective bundle is packed into one packing unit with the aid of the packing apparatus, possibly together with one or several further labeled bundles. A packing unit can contain exactly one labeled bundle or more than one labeled bundle, in particular two labeled bundles.

In a special embodiment example, two bundles coming from the value document processing apparatus directly one after the other belong together, since they have consecutive serial numbers. Then in each case two bundles, which are output by the value document processing apparatus directly one after the other and have immediately consecutive serial numbers, are packed into the same packing unit. For this purpose, the two bundles that belong together are transported to the labeling device by means of the transport device directly one after the other (first to the labeling device and then to the inspection device or vice versa). If the checking of the two bundles that belong together has not revealed any errors, they are packed into one packing unit in each case with the aid of the packing apparatus.

In order to ensure that the two bundles belong together, the two bundles that belong together are e.g. supplied with labels that have the same machine-readable information that the control device has determined for the two bundles together. The two visible serial numbers of the two bundles are preferably linked with the same machine-readable information in the respective linking information (V) or the two visible serial numbers are contained in the same machine-readable information in coded form. The two bundles that belong together are supplied with identical labels during labeling, for example. But it can also be different labels with the same machine-readable information. Alternatively, the labels of the two bundles that belong together can also have different machine-readable information items that are mutually linked in a database, which e.g. is stored in the control device.

To ensure that the correct two bundles are packed into the same packing unit, when checking the bundle—in addition to the matching of the visible serial numbers—it can be verified whether two consecutive bundles always belong together, e.g. on the basis of the machine-readable information of the bundles verified one after the other. For this purpose, it is additionally verified whether the two labels of two bundles verified directly one after the other belong to one another, in particular by comparing the two labels of the two bundles that are applied to these bundles or that have been provided for application to these bundles. The machine-readable information of the two consecutive bundles can be compared with one another, e.g. be verified with respect to a match, or it can be verified with the aid of the above-mentioned database whether their machine-readable information items are linked to one another. Depending on whether the checking establishes that the two bundles verified directly one after the other belong to one another or not, the further processing of these two bundles is continued or stopped. When the further processing is continued, they are e.g. packed into the same packing unit by the packing apparatus (and labeled beforehand, if not already done).

BRIEF DESCRIPTION OF THE DRAWINGS

Further advantages, features and application possibilities of the present invention will result from the following description in connection with the figures. There are shown.

DETAILED DESCRIPTION OF VARIOUS EMBODIMENTS

Figure 1:
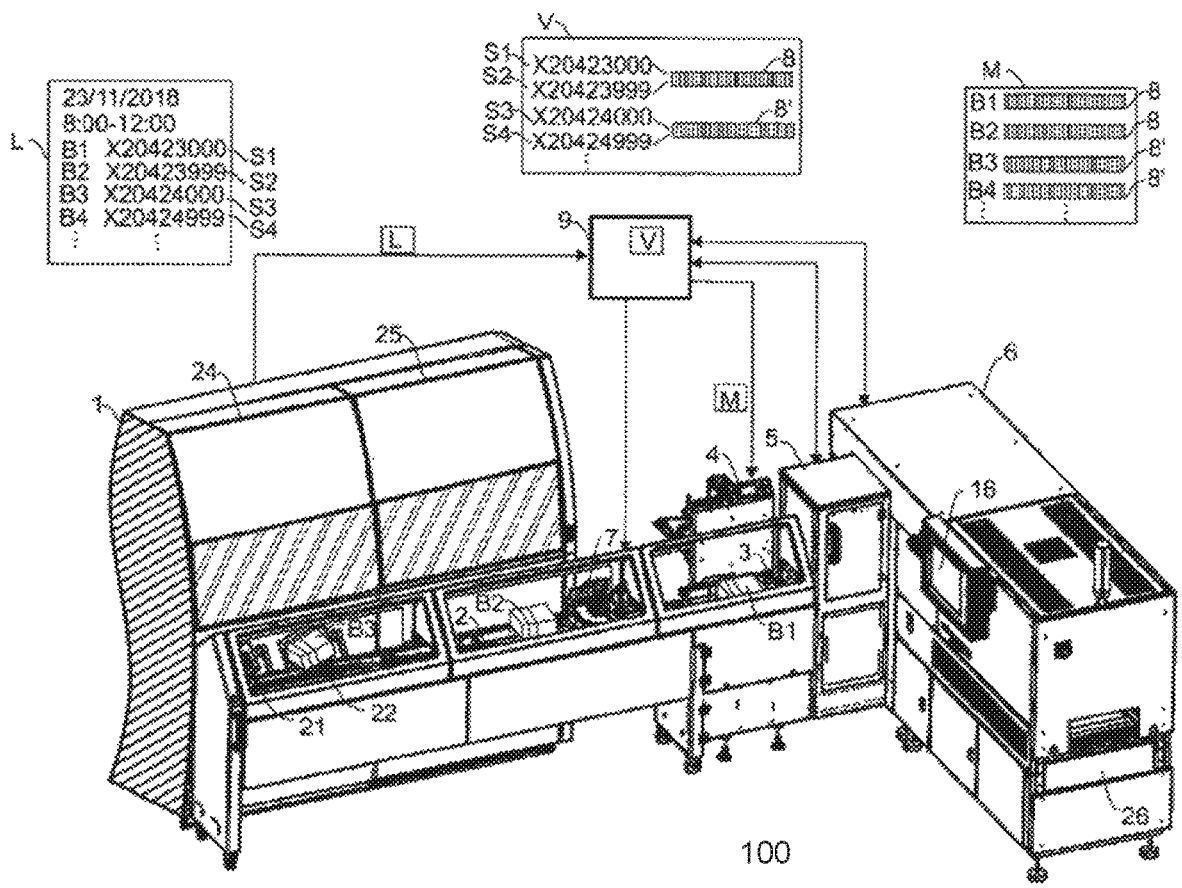
FIG. 1 an embodiment example of an apparatus for the further processing of value documents.

FIG. 1 shows an embodiment example of an apparatus 100 for the further processing of value documents, in particular banknotes, which is connected to a value document processing apparatus 1. Only the right part of the value document processing apparatus 1 is shown in FIG. 1, which comprises the output module 24 with the output pockets 21, 22 and an optionally available shredder module 25. The value documents made available in an input pocket of the value document processing apparatus 1 are picked individually from the input pocket with the aid of a singler and transported in the value document processing apparatus 1 along a transport path past one or several sensors (not shown). Physical properties of the value documents are detected and converted into corresponding sensor signals, which are considered in a control and evaluation device of the value document processing apparatus 1 to identify and verify the value documents, for example with regard to quality, denomination, authenticity or state. Switches arranged along the transport path are controlled by the control and evaluation device in such a manner that the value documents are transported to different output pockets 21, 22 or to the shredder module 25, in dependence on the result of the recognition or verification. Upstream of the output pockets 21, 22 there are e.g. spiral slot stackers in the value document processing apparatus 1, with which the value documents are stacked.

In a special variant, the stacked value documents are combined in a banding device by means of a band 11 to form a banded packet 13 in each case, cf. FIGS. 2a-d. The banded packets 13 are then fed to a packet stacker and there stacked to form a stack of value documents made up of several banded packets 13. If the respective value document stack contains a predetermined number of banded packets 13 or if it reaches a predetermined stack height, it is fed to a bundler in which the packets located in the value document stack are bundled with an enclosing material 12 to form a bundle B1, B2, cf. FIGS. 2a-d. The enclosing material 12 serves to physically hold together the stack of value documents in the bundle B1, B2 so that it does not fall apart when it is transported on. The enclosing material 12 can be a circumferential band around the value document stack or a web of material, e.g. a foil web of a transparent foil, which encloses the stack of value documents in a ring shape, wherein the ends of the material web are welded together. The stack of value documents enclosed in a ring shape is covered e.g. on four of the six sides by the web of material and open on two opposite sides. cf. FIGS. 2a-d. The respective bundle is preferably enclosed with the enclosing material 12 in such a manner that the visible serial number S1, S2 of the bundle remains clearly visible from the outside despite the enclosing material, e.g. only a region outside the visible serial number is enclosed. Alternatively, the value documents stacked by the spiral slot stacker can also be stacked without banding to form a value document stack of loose value documents, which is fed directly to the bundler in order to bundle the loose value documents with the enclosing material.

The finished bundles B1, B2, B3 are output by the value document processing apparatus 1 into the output pockets 21, 22 and from there, possibly with the aid of a transfer flap, transferred to a transport device 2 (e.g. a conveyor belt) that transports the bundles B1, B2, B3 to the further processing apparatus 100. If value documents are continuously available for processing in the input pocket of the value document processing apparatus 1, bundles are continuously produced, which are transferred to the transport device 2. Along the transport device 2, the bundles can pass through an optionally present turning station 7 in which the bundles can be rotated by 180° if necessary. For example, either the first bundle B1 or the second bundle B2 is rotated. In the embodiment example shown, the bundles are transported by the transport device 2 to a labeling device 4 and subsequently to an inspection device 5. Alternatively, however, the inspection device 5 can also be arranged upstream of the labeling device 4 along the transport device 2.

The value documents each have a unique serial number that distinguishes them from all other value documents. The value document processing apparatus 1 recognizes the serial number of each processed value document. In order to be able to uniquely identify the respective bundle, the value document processing apparatus 1 determines for each bundle output into the output pocket a visible serial number of the respective bundle that is representative of the bundle and visible from outside the bundle. The visible serial number of the bundle is the serial number of the uppermost or lowermost value document in the stack of the respective value-document stack of the bundle. The other serial numbers are not visible, since they are disposed inside the stack and are therefore covered by an adjacent value document. If the value documents are equipped with their serial number only on one side, it depends on the orientation of the value documents in the stack of value documents whether the visible serial number is that of the uppermost or lowermost value document in the stack, depending on whether the value documents have their side having the serial number face up or face down in the stack.

The value document processing apparatus 1 transmits the visible serial numbers S1, S2, S3, S4 of the bundles B1, B2, B3, B4 to a control device 9 of the further processing apparatus 100, e.g. in the form of a serial number list L, cf. FIG. 1. The sequence of the visible serial numbers in the list L corresponds to the sequence in which the bundles B1, B2, B3, B4 are transferred from the value document processing apparatus 1 to the transport device 2 and transported on the transport device 2 to the labeling device 4.

The control device of the further processing apparatus 100 is adapted to drive the labeling device 4 and the inspection device 5 and, possibly, to drive the transport devices 2 and possibly 3. In the example shown, the control device 9 is an independent device. The control device 9 can, however, also be adapted to drive the packing apparatus 6 and can be arranged on or in the packing apparatus 6 for this purpose.

The control device 9 determines a machine-readable identification 8, 8', e.g. a bar code, for each of the visible serial numbers S1, S2, S3, S4 transmitted by the value document processing apparatus 1, and links this machine-readable identification with the respective serial number in a linking information item V, which is stored in the control device 9. For example, the respective visible serial number is contained in coded form in the machine-readable identification. In the example of the linking information item V shown in FIG. 1, two visible serial numbers S1, S2 are assigned the same machine-readable identification 8, wherein both visible serial numbers are contained in coded form in the machine-readable identification 8. Alternatively, a separate machine-readable identification can also be determined for each visible serial number.

The machine-readable identifications 8, 8' of the bundles B1, B2, B3, B4 are transmitted from the control device 9 to the labeling device 4, e.g. in the form of a list M of machine-readable identifications, in which the machine-readable identifications of the bundles are listed in the same sequence in which the bundles B1, B2, B3, B4 were transferred from the value document processing apparatus 1 to the transport device 2.

The labeling device 4 has e.g. a label printer (not shown) that creates a label for each of the bundles B1, B2, B3, B4 and an attaching device (not shown) that attaches (bonds in the case of self-adhesive labels) the printed labels to the enclosing material 12 of the respective bundle, as well as a control device (not shown) for driving the label printer and the attaching device. The control device of the labeling device ensures that labels are supplied with the machine-readable information 8, 8' in accordance with the list M of machine-readable information. For this purpose, the label printer prints on each label that machine-readable identification contained in the list M which is linked to the visible serial number of the respective bundle that is to be labeled with the respective label. For the bundles B1, B2, B3, B4, the label printer accordingly first prints two labels with the machine-readable information 8, which are created for the bundles B1 and B2, and then two labels with the machine-readable information 8', which are created for the bundles B3 and B4. An example of a label created for the bundles B1 and B2 is shown in FIGS. 2a and 2b.

These labels are then attached to the bundles arriving at the labeling device 4 in the sequence in which the machine-readable identifications are listed in the list M, i.e. in the sequence in which the bundles B1, B2, B3, B4 were transferred by the value document processing apparatus 1 to the transport device 2. The respective label is attached to the enclosing material 12 of the respective bundle in a region of the respective bundle which is outside the visible serial number of the respective bundle. The labeled bundles B1, B2, B3, B4 are then transported with the aid of a transport device 3 from the labeling device 4 to the inspection device 5 and then to a packing apparatus 6.

Figure 2A:
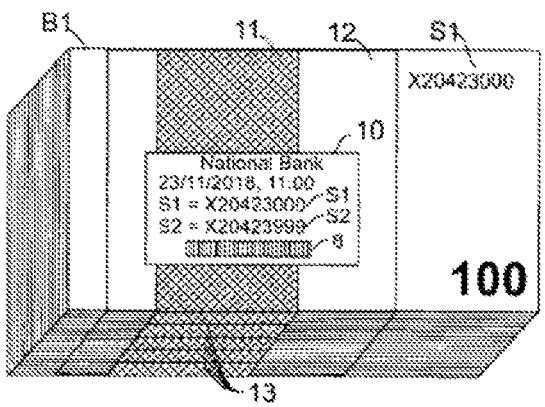
FIG. 2a-d a first labeled bundle (FIG. 2a) and a third labeled bundle (FIG. 2d) with label on the side of the visible serial number and a second labeled bundle (FIG. 2b), in which the label is applied opposite the visible serial number, and FIG. 3 an embodiment example of an inspection device, and FIG. 4 a camera image detected by the camera of the inspection device, and FIG. 5a-b a packing unit with a single bundle (FIG. 5a) and a packing unit with two bundles that belong together (FIG. 5b).
Figure 2B:
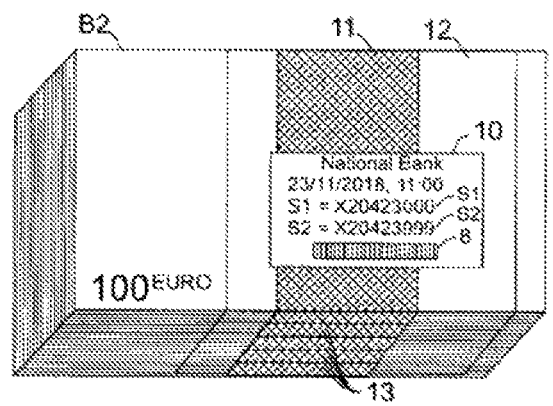

In FIGS. 2a and 2b, two labeled bundles B1, B2 are shown by way of example, in each of which 5 banded value document packets 13, each banded with a band 11, are enclosed with a foil web 12 in a ring shape. A label 10 is attached to the foil web 12 in each case. In this example, the date and time of further processing and the machine-readable identification 8, which is linked to the visible serial number of the respective bundle, are printed on the label 10. Optionally, the visible serial number of the respective bundle can also be printed in plain text on the label 10. In the example shown, the two visible serial numbers S1 and S2 of the two bundles B1 and B2 are printed in plain text, as is preferred for the special embodiment example, which will be explained later. Alternatively, only the one visible serial number of the respective bundle can also be printed in plain text on the respective label.

In the case of the bundle B1, that side of the bundle was supplied with the label 10 on which the upper side of the uppermost value document of the stack lies, which also bears the visible serial number of the bundle, cf. FIG. 2a. In the case of bundle B2, that side of the bundle was supplied with the label 10 on which the lower side of the lowermost value document of the stack lies, on which there is no visible serial number of the bundle, cf. FIG. 2b. The side of the bundle opposite this side, which bears the visible serial number of the bundle B2, is depicted in FIG. 2c.

Figure 3:
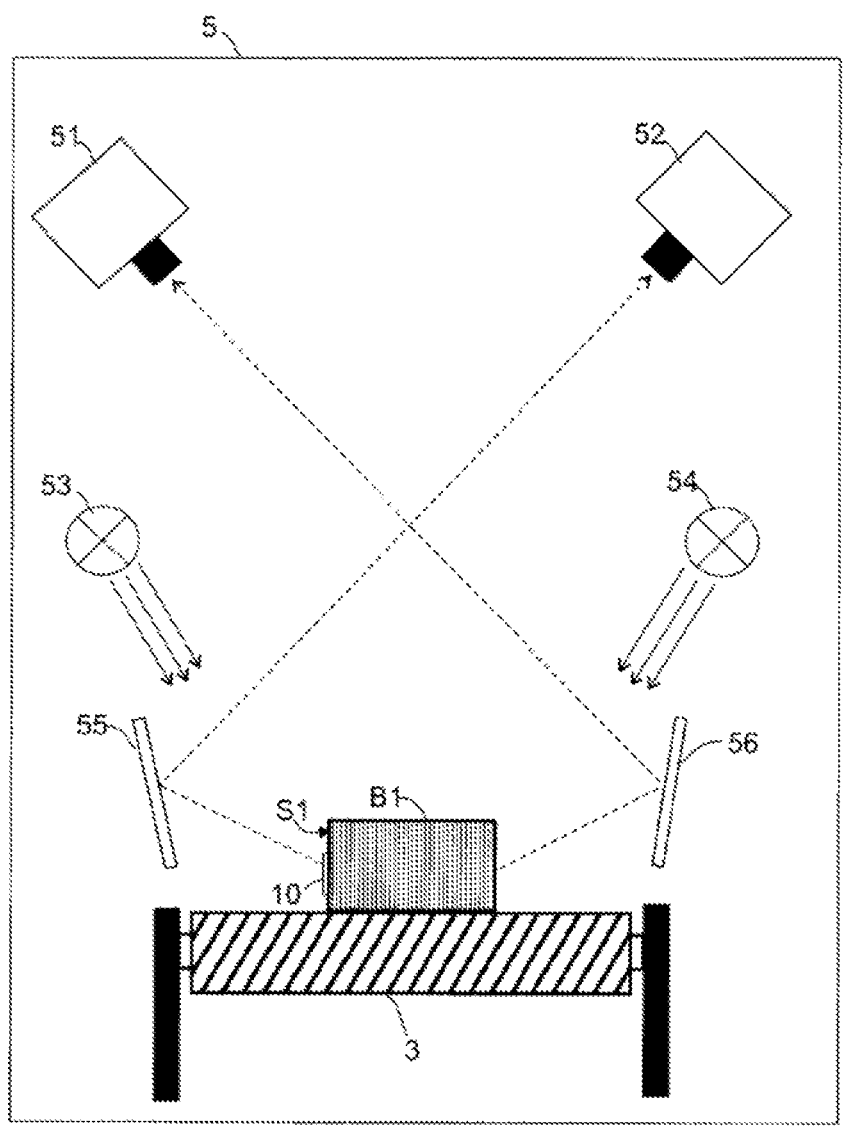
Figure 4:
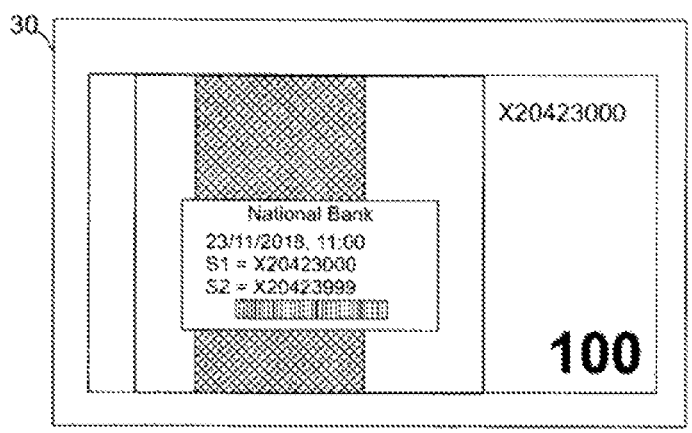

In FIG. 3, an inspection device 5 is shown by way of example, which has two cameras 51, 52. The bundle B1 was transported into the inspection device 5 by the transport device 3. For illuminating the bundle B1 there serve two light sources 53, 54, which illuminate two mutually opposite sides of the bundle B1, in FIG. 3 the left and right side of the bundle B1. The two opposite bundle sides are imaged to the cameras 51, 52 via two mirrors 55, 56. For detecting the two camera images, the transport of the bundle B1 is briefly stopped. The camera 52 records an image 30 of the left side of the bundle to which the label 10 of the bundle B1 is attached and on which the visible serial number S1 of the bundle B1 is disposed. The image recorded by the camera 52 with the label and the visible serial number S1 is shown in FIG. 4.

Figure 2C:
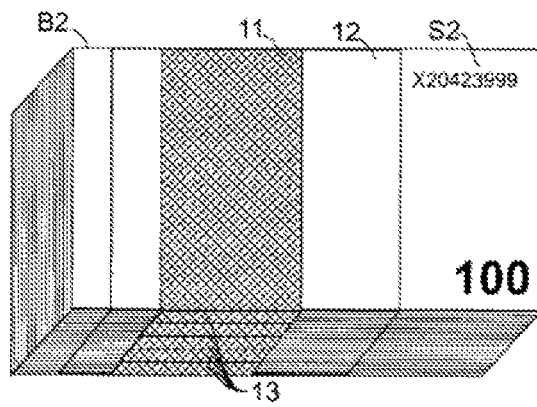

If the visible serial number is not on the side of the label but on the opposite side of the bundle, as is the case with the bundle B2 from FIGS. 2b, 2c, the visible serial number is depicted on the image recorded by the other camera 51 and the label on that of the camera 52. The information on which of the recorded images the serial number and on which the label is expected can be deposited in the control device 9 for each bundle. In the present example of the bundles B1, B2, B3, B4, the visible serial number and the label are alternately on the same bundle side (for B1 and B3) and on opposite bundle sides (for B2 and B4).

In order to check the correct labeling of the bundle B1, the serial number of the bundle B1, which it actually has (and is referred to as the actual serial number), is extracted from the recorded image 30 and compared with that serial number that is linked to the machine-readable identification 8 of the label. The checking is preferably carried out by the control device 9, to which the images recorded by the cameras 51, 52 are transmitted. To extract the serial number, it can be helpful that the position of the serial number within the value document, which can be different for each value document type, is transmitted from the value document processing apparatus 1 to the control device 9. The control device 9 reads the actual serial number X20423000 from the image section located at this position by means of a known character recognition method.

The control device 9 gathers the machine-readable identification 8 of the respective label 10 from the image section of the image 30 in which the label 10 is depicted. On the basis of the linking information V stored in the control device 9, the control device 9 then ascertains the visible serial number X20423000 of the bundle B1 linked to the machine-readable information 8 of the bundle B1. The control device 9 subsequently compares the actual visible serial number X20423000 of the bundle B1 with the visible serial numbers X20423000 and X20423999 specified by the machine-readable identification 8 of the label 10 of the bundle B1. Since this actual serial number matches one of these two serial numbers, the labeled bundle B1 is assessed as correctly labeled.

Figure 2D:
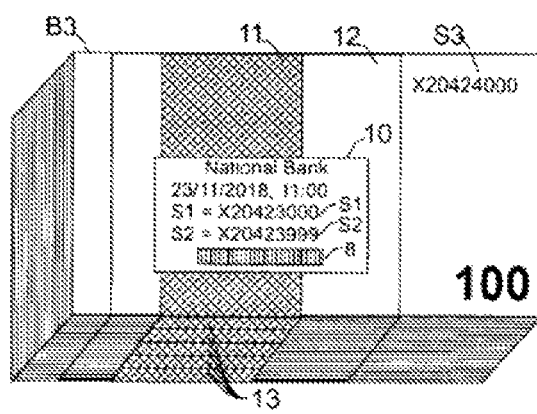

If, however, the sequence of the bundles B1, B2, B3, . . . in which the bundles arrive at the labeling device 4 is changed—e.g. by the intervention of an operator—and the bundle B3 is mistakenly supplied with the label 10 provided for the bundle B1, cf. FIG. 2d, this is recognized when checking the correct labeling. For in this case, S3 (X20424000) is extracted from the image recorded by the camera 52 as the actual visible serial number, whereas the label 10 through the machine-readable identification 8 specifies the visible serial numbers X20423000 and X20423999. Since the serial numbers do not match here, the bundle B3 from FIG. 2d, which has accidentally been supplied with the label 10 provided for the bundle B1, is assessed as having been incorrectly labeled.

If a bundle is assessed as incorrectly labeled, the control device prevents packing by the packing apparatus 6. For example, the control device 9 can cause the transport apparatus 3 to stop and output a corresponding error message to the operator at the operator interface 16, which prompts the operator to remove the incorrectly labeled bundle. In order to ensure a continuous transport away of the bundles even in the case of incorrectly labeled bundles, the control device 9 can alternatively still cause the bundles to be transported to the packing apparatus 6 and only prevent the incorrectly labeled bundles from being packed, e.g. by causing the packing apparatus to sort out the respective incorrectly labeled bundles so that they are output from the packing apparatus 6 in an unpacked state.

Figure 5A:
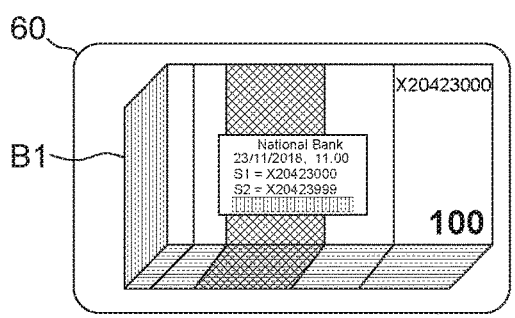

Those labeled bundles which are assessed as correctly labeled during the checking are forwarded by the control device 9 to the packing apparatus. The control device 9 causes the transport device 3 to transport these bundles to the packing apparatus 6, which then packs the bundles with packing material and outputs them at an output opening 26. For example, the individual bundle B1 is packed into a packing unit 60 by the packing apparatus 6 with a packing material, e.g. a shrink foil, cf. FIG. 5a.

In the packing apparatus 6, one or several bundles can be packed with a packing provided for this purpose. The packing units 60 obtained by packing, with the bundles respectively packed therein, are then available for further employment or processing, such as further transport and/or storage of the bundles. The packing can be a flexible packing material with which the respective bundle or bundles are wrapped, or an already existing container that is filled with one or several bundles and possibly subsequently closed. The container with the labeled bundles introduced therein then forms the packing unit.

Figure 5B:
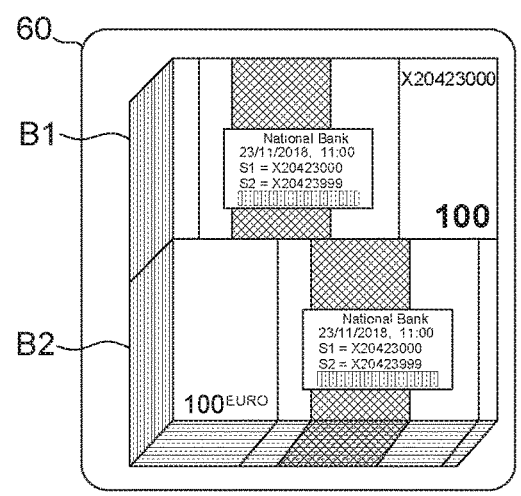

In a special embodiment example, the value document processing apparatus 1 is used to verify newly produced value documents, the serial numbers of which are consecutive. For example, the 1000 value documents with the consecutive serial numbers X20423000 to X20423999 are processed immediately one after the other (then the 1000 value documents with the X20423000 to X20423999, . . . ). If these consecutive serial numbers are output by the value document processing apparatus 1 in tandem, i.e. alternately as a bundle of 500 value documents, in two different output pockets, the serial numbers of the value documents that end up in a single one of these output bundles of 500 B1 are not continuously consecutive, but only the two successive bundles of 500 B1 and B2 together have the value documents with consecutive serial numbers, i.e. all 1000 value documents with the serial numbers X20423000 to X20423999. Thus, in each case two bundles B1, B2 coming from the value document processing apparatus 1 directly one after the other belong together, since they have consecutive serial numbers. In order to ensure that the two bundles B1 and B2 stay together, they are preferably packed into a single packing unit 60, cf. FIG. 5b.

In order to ensure that the two bundles B1, B2 belong together, each of these two bundles B1, B2 is also given a label 10 on which the machine-readable information 8 is applied, with which the two visible serial numbers S1, S2 of the two bundles B1, B2 are linked. For simplification, the two bundles B1, B2 that belong together can receive identical labels 10, cf. FIGS. 2a, 2b and 5b. In addition to the date and time and the machine-readable identification 8, also the two visible serial numbers S1 and S2 of the two bundles B1 and B2 are printed in plain text on each label 10.

If the operator interchanges the correct sequence of the bundles, it can also occur that two bundles that do not belong together are packed into a packing unit 60. If the apparatus, for example, allows the operator allows access to a position between the labeling device 4 and the inspection device 5, he can interchange the sequence of the bundles there without this resulting in incorrect labeling of the bundles. The above-mentioned checking of the correct labeling would then not detect any errors. When checking the bundles, the control device 9 can therefore, if necessary, additionally check on the basis of the images recorded by the inspection device 5, whether two consecutive bundles always belong together, e.g. by comparing the machine-readable information items 8 of the two labels 10 of the successive bundles B1, B2 or by comparing the labels 10 for a match. If this additional checking has the result that two consecutive bundles do not belong together, the further processing of the two bundles, in particular the packing of the two bundles, is stopped and a corresponding error message is output to the operator. If it turns out that two successive bundles belong together, the two bundles are packed into the same packing unit 60, cf. FIG. 5b.

The invention claimed is:

1. A method for further processing value documents which, with a value document processing apparatus, have been stacked to form stacks of value documents and have been bundled together with an enclosing material to form a bundle, with the steps of:
   determining a visible serial number of the respective bundle by the value document processing apparatus,
   transmitting the visible serial number of the respective bundle from the value document processing apparatus to a control device,
   determining a machine-readable identification for the respective bundle by the control device based on the visible serial number of the respective bundle,
   producing a linking information item by the control device, which specifies with which visible serial number the respective machine-readable identification is linked,
   transmitting the machine-readable identification from the control device to a labeling device that is adapted for labeling the respective bundle bundled together with the enclosing material to form a bundle,
   creating a label for the respective bundle by means of the labeling device, wherein the machine-readable identification transmitted by the control device is applied to the respective label,
   transporting the respective bundle output from the value document processing apparatus and bundled together with an enclosing material to form a bundle to the labeling device with the aid of a transport device in order to label the respective bundle with the label created for the respective bundle, wherein the labeling device is separated from the value document processing apparatus by the transport device,
   detecting the respective bundle by an inspection device which has at least one camera with which it records an image of the respective bundle on which the visible serial number of the respective bundle and the label of the respective bundle is depicted, and
   checking the respective bundle after the bundle has been transported away from the value document processing apparatus by the transport device, wherein when checking the respective bundle,
      an actual visible serial number of the respective bundle is extracted from the image recorded by the inspection device,
      the visible serial number is ascertained which belongs to the machine-readable identification of the label that was created for the respective bundle based on the visible serial number of the respective bundle, and
      the actual visible serial number of the respective bundle is compared with the visible serial number belonging to the machine-readable identification of the respective label,
   wherein, in dependence on whether the checking of the respective bundle has a result that the actual visible serial number of the respective bundle matches the visible serial number belonging to the machine-readable identification of the respective label or not, the further processing of the respective bundle is continued in a case that there is a match and stopped in a case that there is not a match.

2. The method according to claim 1, wherein the respective bundle is labeled with the label created for the respective bundle before the respective bundle is detected by the inspection device so that the inspection device detects the already labeled bundle.

3. The method according to claim 2, wherein, for detecting the machine-readable identification of the respective label, the inspection device extracts the machine-readable identification of the respective label from the recorded image or a different image recorded by the inspection device, which the inspection device has recorded of the respective bundle,
   wherein the different image is recorded from the side of the bundle opposite the recorded image which is directed to the opposite side of the bundle.

4. The method according to claim 1, wherein the respective bundle is detected by the inspection device before the respective bundle is labeled with the label created for the respective bundle, so that the inspection device detects the not yet labeled bundle.

5. The method according to claim 1, wherein the enclosing material is a pre-packing material with which the bundle is enclosed in a ring shape.

6. The method according to claim 1, wherein the enclosing material is a band.

7. The method according to claim 1, wherein the respective stack of value documents which is bundled together to form a bundle is a stack of loose value documents or is a stack of several banded packets which are bundled together to form a bundle.

8. The method according to claim 1, wherein the value documents verified by the value document processing apparatus are bundled together to form a multiplicity of bundles and these are transferred to the transport device in such a manner that the bundles are transported in a certain sequence one after the other to the labeling device by means of the transport device, and that the value document processing apparatus transmits the visible serial numbers of the bundles transferred to the transport device with the same sequence to the control device in which the associated bundles are provided to be transported by the transport device to the labeling device.

9. The method according to claim 8, wherein the value document processing apparatus transmits the visible serial numbers serially in this sequence to the control device or transmits a list with visible serial numbers to the control device, in which the sequence of the visible serial numbers corresponds to the sequence in which the associated bundles are provided to be transported to the labeling device by the transport device.

10. The method according to claim 9, wherein the machine-readable identifications of the bundles are transmitted from the control device to the labeling device with the same sequence in which the associated bundles are provided to be transported to the labeling device by the transport device.

11. The method according to claim 1, wherein respectively two bundles, whose stacks of value documents have been output by the value document processing apparatus and transported to the labeling device by means of the transport device directly one after the other, and whose checking has not revealed any error, are packed into one respective packing unit with the aid of a packing apparatus.

12. The method according to claim 1, wherein in each case two bundles, whose stacks of value documents have been output by the value document processing apparatus and transported to the labeling device by means of the transport device directly one after the other, are supplied with labels during labeling, which have the same machine-readable information.

13. The method according to claim 12, wherein the two visible serial numbers of the two bundles are contained in the same machine-readable information in coded form.

14. The method according to claim 1, wherein when checking the bundles, it is additionally verified whether respectively two bundles that are transported to the labeling device and verified directly one after the other, belong to one another, and in dependence on whether the two bundles directly following one after the other belong to one another or not, the further processing of the two bundles is continued or stopped,
  wherein, in the case of continuing the further processing, they are packed into the same packing unit by a packing apparatus.

15. The method according to claim 1, wherein the visible serial number of the respective bundle is the serial number of a value document that is uppermost or lowermost in the stack of the respective bundle.

16. The method according to claim 1, wherein the respective bundle is checked before the respective bundle is labeled with the label created for the respective bundle.

17. The method according to claim 16, wherein in a case that there is a match, the respective bundle is labeled with the label, and in a case that there is not a match, the respective bundle is prevented from being labeled.

18. The method according to claim 1, wherein the respective bundle is checked before or after the respective bundle is labeled with the label created for the respective bundle, wherein in a case that there is a match, the respective bundle is transported to a packing device, and in a case that there is not a match, the respective bundle is prevented from being transported to a packing device.

19. An apparatus for further processing value documents that have been processed with a value document processing apparatus and stacked to form stacks of value documents and that have been bundled together with an enclosing material to form a bundle,
  wherein the value document processing apparatus has determined a respective visible serial number of the respective bundle,
  wherein the apparatus has:
  a control device which is connected to the value document processing apparatus and is adapted to process the respective visible serial number determined by the value document processing apparatus of the respective bundle from the value document processing apparatus, and to determine a machine-readable identification for the respective bundle based on the visible serial number of the respective bundle and to produce a linking information item which specifies with which visible serial number the respective machine-readable identification is linked,
  a labeling device which is connected to the control device and is adapted to process a machine-readable identification transmitted by the control device to the labeling device, and which is adapted to create a label which has the machine-readable identification transmitted by the control device, and which is adapted to label the respective bundle bundled together with the enclosing material to form a bundle,
  a transport device for transporting the respective bundle output from the value document processing apparatus and bundled together with an enclosing material to form a bundle to the labeling device in order to label the respective bundle with the label created for the respective bundle, wherein the labeling device is separated from the value document processing apparatus by the transport device, and
  an inspection device for detecting the respective bundle, which has at least one camera which is arranged such that it can record an image of the respective bundle on which the visible serial number of the respective bundle and its label are depicted,
  wherein the inspection device and/or the control device is adapted to check the respective bundle after the bundle has been transported away from the value document processing apparatus by the transport device, and, when checking the respective bundle, is adapted to:
  extract an actual visible serial number of the respective bundle from the image recorded by the inspection device,
  ascertain the visible serial number that belongs to the machine-readable identification of the label that was created for the respective bundle based on the visible serial number of the respective bundle, and
  compare the actual visible serial number of the respective bundle with the visible serial number belonging to the machine-readable identification of the respective label,
  wherein, in dependence on whether the checking of the respective bundle has a result that the actual visible serial number of the respective bundle matches the visible serial number belonging to the machine-readable identification of the respective label or not, the further processing of the respective bundle is continued in a case that there is a match and stopped in a case that there is not a match.

20. The apparatus according to claim 19, wherein the respective bundle is checked after the respective bundle is labeled with the label created for the respective bundle.

* * * * *